United States Patent [19]

Parups et al.

[11] 3,865,569

[45] Feb. 11, 1975

[54] PRESERVATION OF CUT BLOOMS

[75] Inventors: Edwin V. Parups; Allan P. Chan, both of Ottawa, Ontario, Canada

[73] Assignee: Canadian Patent and Development Limited, Ottawa, Ontario, Canada

[22] Filed: Mar. 22, 1973

[21] Appl. No.: 343,916

[52] U.S. Cl. .................................................. 71/68
[51] Int. Cl. .............................................. A01n 3/02
[58] Field of Search ........................................ 71/68

[56] References Cited
UNITED STATES PATENTS

| | | | |
|---|---|---|---|
| 2,971,292 | 2/1961 | Malecki | 71/68 |
| 3,370,962 | 2/1968 | Farhi et al. | 71/68 |

FOREIGN PATENTS OR APPLICATIONS

| | | | |
|---|---|---|---|
| 1,597,028 | 6/1970 | France | 71/68 |

*Primary Examiner*—James O. Thomas, Jr.
*Attorney, Agent, or Firm*—Alan A. Thomson

[57] ABSTRACT

A formulation for preserving cut plant stems and floral blooms comprising:
  a. sucrose
  b. isoascorbic or ascorbic acid or their salts, and
  c. 8-hydroxyquinoline, its sulphate or other salts.

A preferred dry mixture comprises (a) about 200 to 500 parts by wt.; (b) about 0.8 to 2 parts; and (c) about 0.4 to 1 part. A preferred aqueous solution comprises about 2-5% by wt. of (a); about 80-200 ppm of (b); about 40-100 ppm of (c) and a pH of about 3-5. The preservative composition is particularly effective for the extension of cut bloom life and prevention of "bent neck" of roses although other cut blooms have shown prolonged fresh appearance as well.

10 Claims, No Drawings

PRESERVATION OF CUT BLOOMS

This invention is directed to the preservation of cut flowers and plant stems and prolonging their fresh-cut appearance. A formulation is provided which is particularly effective with roses, but is also advantageous with carnations, snapdragons and other blooms.

Compositions are known which will prolong the life of cut vegetation. U.S. Pat. No. 3,122,432 Feb. 25, 1964 Biggs describes a preservative containing sucrose, potassium sulphate, boric acid, sodium benzoate and orthophosphoric acid or a phosphate salt. British Pat. No. 1,122,662 Aug. 7, 1968 Bruce et al. uses a urea derivative to improve the storage characteristics of various plant materials. Canadian Pat. No. 800,545 Dec. 3, 1968 Siegel (U.S. Pat. No. 3,320,046 May 16, 1967) describes a formulation for conditioning cut flowers containing certain soluble metal salts, organic reducing agents e.g., ascorbic or isoascorbic acid preferably plus tryptophane or thiourea, and antioxidants (vinyl ethers or phenols). The Jour. Amer. Soc. Hort. Sci. 96 (1) pages 38–41, 1971 Marousky mentions the use of 8-hydroxyquinoline citrate and sucrose to increase cut rose longevity. These known formulations all give some improvement (over water itself) in preserving certain plant tissues. It would be desirable to improve still further on the cut-life of flowers, particularly those which are widely used by florists.

The present invention results in a further improvement in the cut-life of flowers particularly roses, snapdragons, and carnations. The preservative composition comprises sucrose isoascorbic or ascorbic acid (or their soluble salts) and 8-hydroxyquinoline. The composition is dissolved in water and the plant stems maintained wet with the solution. The solution prolongs colour retention, prevents the serious occurrence of premature wilting of cut roses and extends the life.

As a dry mixture, the composition comprises:
a. sucrose, in an effective amount up to about 500 parts (the amount of sucrose is not critical);
b. isoascorbic or ascorbic acid (or their soluble salts) in amounts from about 0.8 to 2 parts; and
c. 8-hydroxyquinoline (or its soluble salts) in amounts from about 0.4 to 1 part, all parts being by weight.

Preferably isoascorbic acid is used in (b). A suitable amount of sucrose is usually about 200–500 parts. Before use this mixture is dissolved in water to give an aqueous solution containing about 2–5% by wt. sucrose. This solution should also contain about 80–200 ppm isoascorbic or ascorbic acid and about 40–100 ppm 8-hydroxyquinoline. "ppm" is parts per million by wt. Slight variations can be made in these amounts while still obtaining some of the benefits of the invention.

Salts of isoascorbic or ascorbic acid which may be added instead of the acid include the sodium, potassium, ammonium, calcium, magnesium etc. salts.

Salts of 8-hydroxyquinoline which may be used include the sulphate, chloride, citrate, tartrate, phosphate etc.

It is preferable but not essential that the aqueous solution have a pH of about 3–5. The sucrose, ascorbic acid and hydroxy-quinoline salt will usually give an acid pH, but if desired acidic salts or buffers can be used to maintain the acidic pH. A phosphate-citrate buffer about pH 4 has been used with good results with the exception of snapdragons. A pH of about 4 is preferred with roses.

Other components may be added to incorporate additional soluble nutrients, trace elements, dyes etc. for special effects. They must be compatible with the system and not injurious in use.

Best results have been obtained with the preservative using the following procedure recommended for cut flowers. Before placing cut blooms in the preservative re-cut stem ends, cutting off some 2–5 cm. of the stem. This practice helps to prevent formation of air-blocks in the water-conducting tissues which would interrupt the normal water uptake by the cut flowers. Delayed placement in the preservative solution will usually result in a shorter cut-life. It may be beneficial to renew the preservative solution after a few days of usage but in practice replacement of absorbed solution is adequate.

The following Examples are illustrative.

EXAMPLE 1

The formulation of the present invention was compared against four prior art formulations designated A, B, C, and D. A was the formulation of Biggs U.S. Pat. No. 3,122,432

206 g of sucrose
2 g of potassium sulfate
3 g of potassium dihydrogen phosphate trace of boric acid
1.25 g of sodium benzoate
1.50 g of citric acid 25 g of this mixture is dissolved in one pint of water (0.473 liters).

B was the formulation of Siegel U.S. Pat. No. 3,320,046

| | |
|---|---|
| $CuSO_4 \cdot 5H_2O$ | - 50 mg |
| $ZnSO_4$ | - 50 mg |
| $H_3BO_3$ | - 50 mg |
| $MnCl_2 \cdot 4H_2O$ | - 300 mg |
| $NiSO_4 \cdot 6H_2O$ | - 50 mg |
| $Co(NO_3)_2 \cdot 6H_2O$ | - 50 mg |
| KI | - 20 mg |
| KBr | - 20 mg |
| Tryptophane | - 25 mg |
| Thiourea | - 50 mg |
| isoAA | - 100 mg |
| Vinyl 2-chloroethylether | - 50 mg |

C was the "Cornell" solution containing 5% sucrose, 200 ppm of 8-hydroxyquinoline sulphate, 50 ppm of silver nitrate and 50 ppm of calcium nitrate.

D was the solution of Marousky (referred to above) containing 3% sucrose, 200 ppm of 8-hydroxyquinoline citrate and phosphate-citrate buffer pH 3.5.

A formulation was made up according to the present invention consisting of 4% sucrose, 100 ppm isoascorbic acid and 50 ppm of 8-hydroxyquinoline sulphate. Controls were run with the four components individually. The comparative length of cut-life (in days) of fresh cut, greenhouse-grown roses, carnations and snapdragons was determined by keeping them in the test solutions. Records were collected daily to determine the cut-life, firmness, colour and appearance of each type and flower. The experiments were conducted under constant environmental conditions and for roses were terminated when the petals fell or a condition known as "bent neck" developed. Roses cv. "Forever Yours" kept in solutions or formulations without sucrose, showed some blueing at the end of their cut-life.

The carnations and snapdragons were discarded when the blooms of carnations lost colour or became "sleepy," or when half of the florets of snapdragons lost their crisp appearance and/or colour. The number of tests run, 10 blooms or stalks per each test solution, is given in brackets in the Table 1.

Table 1

Cut-life of roses, carnations, or snapdragons, in days. Number of tests run, 10 blooms or stalks per test (in brackets).

| Formulations or solution | Roses | Cut-Life, days Carnations | Snapdragons |
|---|---|---|---|
| Present formulation pH 4.6 | 10.0(10) | 9.7(4) | 13.0(5) |
| Isoascorbic acid, 100 ppm, aqueous | 6.9 (4) | 7.2(4) | 8.0(4) |
| 8-hydroxyquinoline sulphate, 50 ppm, aqueous | 7.0(4) | 6.5(4) | 9.0(4) |
| Sucrose, 4% aqueous | 6.0(4) | 6.4(4) | 9.0(4) |
| Water | 5.0(4) | 5.6(4) | 8.5(4) |
| A | 7.6(4) | 6.0(4) | 4.0(3) |
| B | 5.0(4) | 7.4(2) | 8.0(3) |
| C | 8.7(4) | 11.5(4) | 6.4(4) |
| D | 7.1(3) | 7.7(3) | 8.0(4) |

The figures in this table indicate that the longevity of roses and snapdragons is greater if these flowers are kept in the solution made up according to the present formulation. The "Cornell" solution C was slightly better than the present formulation for carnations; in this case the present solution performed as the second best one. Stems of snapdragons kept in the Biggs' A and in the "Cornell" solution C tended to become brittle thus decreasing their overall longevity and quality.

It should be noted that some plants or flowers and some varieties respond slightly differently to the various formulations. A clear superiority has been shown for the present formulation for roses in particular. There appears to be a synergism between the 3 components as formulations with only one or two of the 3 components were significantly less effective.

EXAMPLE 2

Further tests were carried out on roses. Rose cultivars "Regal Gold," "Baccara," "Better Times" and "Carina" were greenhouse-grown, cut and placed in water and for comparison in the solution of the present invention (as in Example 1). The cut-life was prolonged an average of 3 days by using the solution. This extension of the cut-life of roses is significant since they are probably the most expensive and widely used cut flower. Even roses which have a short cut-life can have their life significantly extended by this formulation.

We claim:

1. A composition for preserving cut plant stems and floral blooms comprising:
   a. sucrose, in up to about 500 parts;
   b. isoascorbic or ascorbic acid or their soluble salts in from about 0.8 to 2 parts; and
   c. 8-hydroxyquinoline, or its soluble salts in from about 0.4 to 1 part, all by wt.

2. The composition of claim 1 adapted to give an acidic pH in solution.

3. The composition of claim 1 in aqueous solution the concentration being about 2–5% by wt. sucrose; about 80–200 ppm isoascorbic or ascorbic acid; and about 40–100 ppm 8-hydroxyquinoline.

4. The composition of claim 1, wherein the isoascorbic or ascorbic acid is as the sodium salt.

5. The composition of claim 1, wherein the 8-hydroxyquinoline is as the sulphate or citrate.

6. The composition of claim 2 having a pH of about 3–5 in aqueous solution.

7. The composition of claim 1 comprising isoascorbic aicd.

8. A method for prolonging the fresh-cut appearance of cut plant stems and floral blooms comprising maintaining the cut stems wet with an aqueous solution comprising the composition of claim 1.

9. The composition of claim 6 buffered to maintain a pH of about 4 in aqueous solution for rose preservation.

10. The composition of claim 3 containing about 4% wt. sucrose, about 100 ppm. isoascorbic acid, and about 50 ppm. 8-hydroxyquinoline sulphate.

* * * * *